3 Sheets—Sheet 3.
J. F. STEWARD & F. J. CODDINGTON.
HARVESTER.
No. 179,140. Patented June 27, 1876.
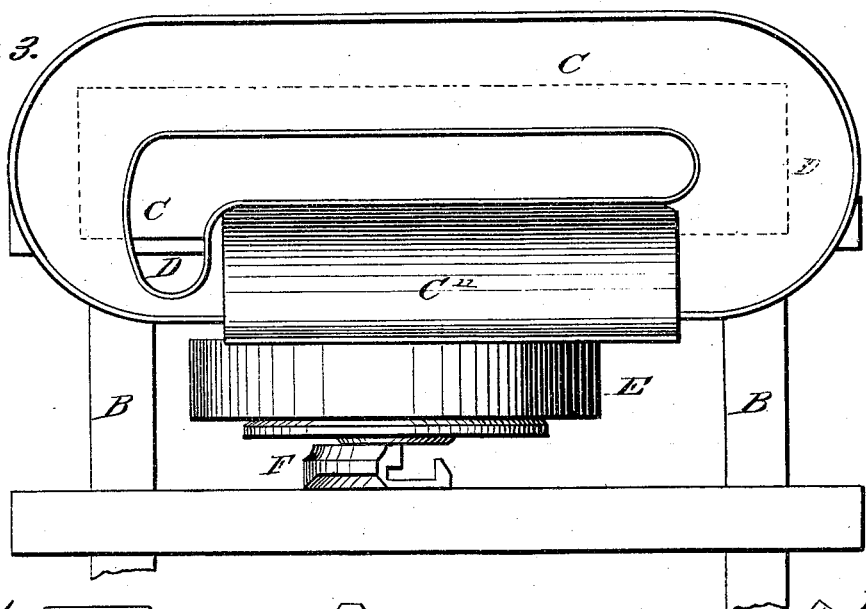
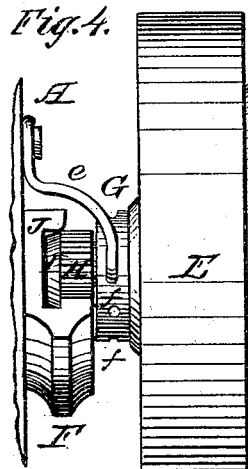
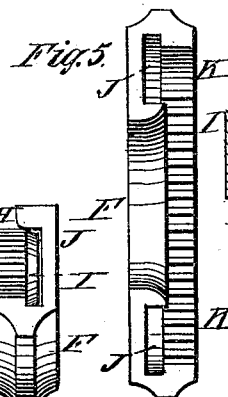
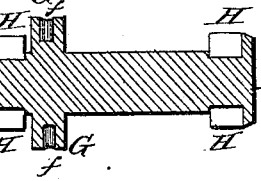
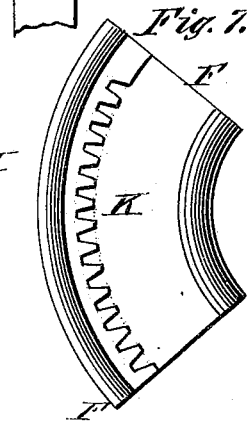
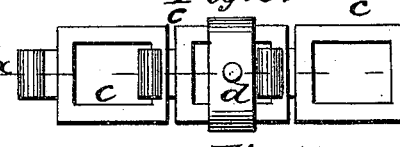
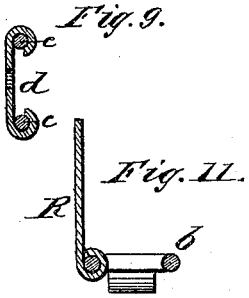
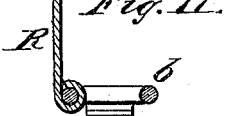
Witnesses:
O. W. Bond
John W. Munday
Inventors:
John F. Steward
Frank J. Coddington
Per: West & Bond Attorneys.
N. PETERS, PHOTO-LITHOGRAPHER, WASHINGTON, D. C.

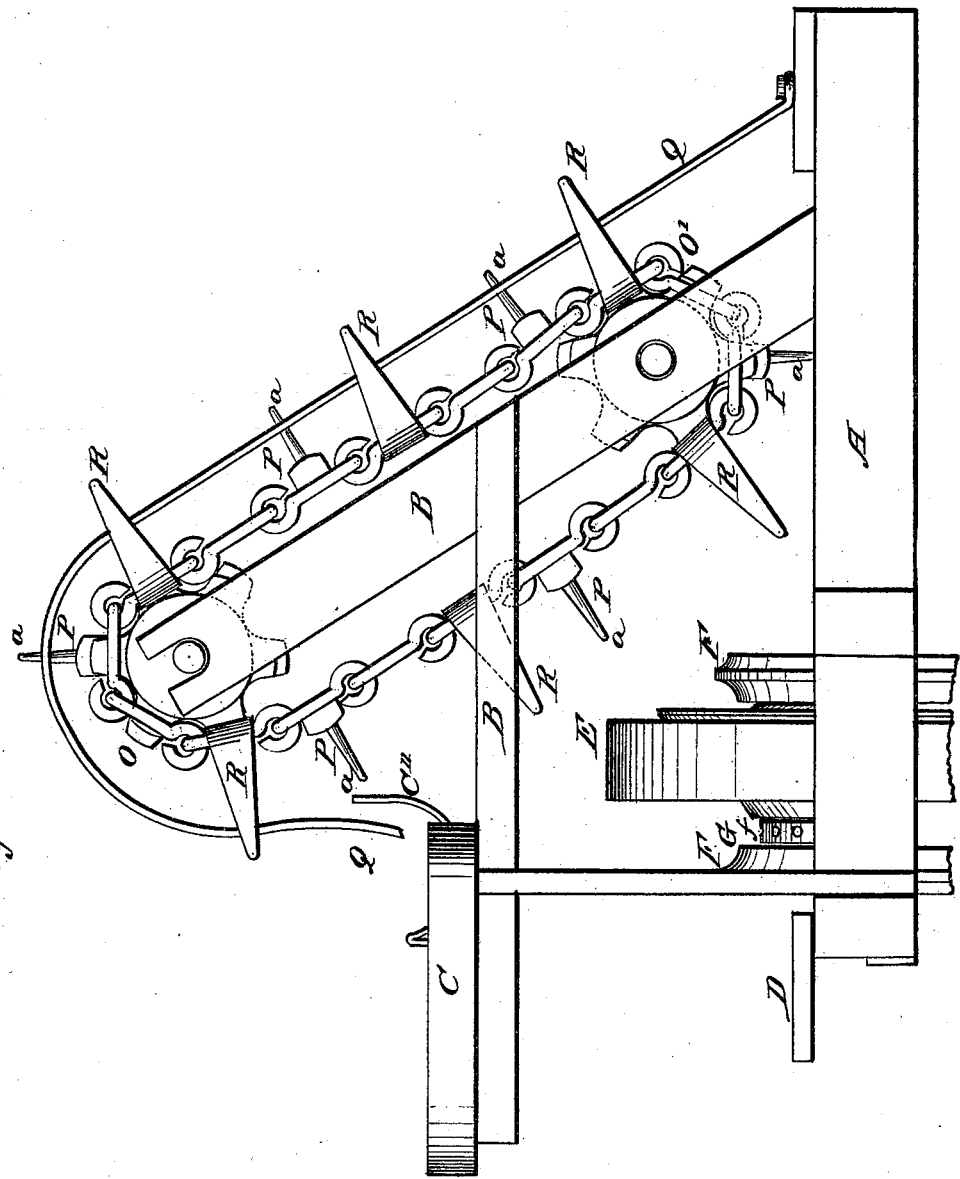

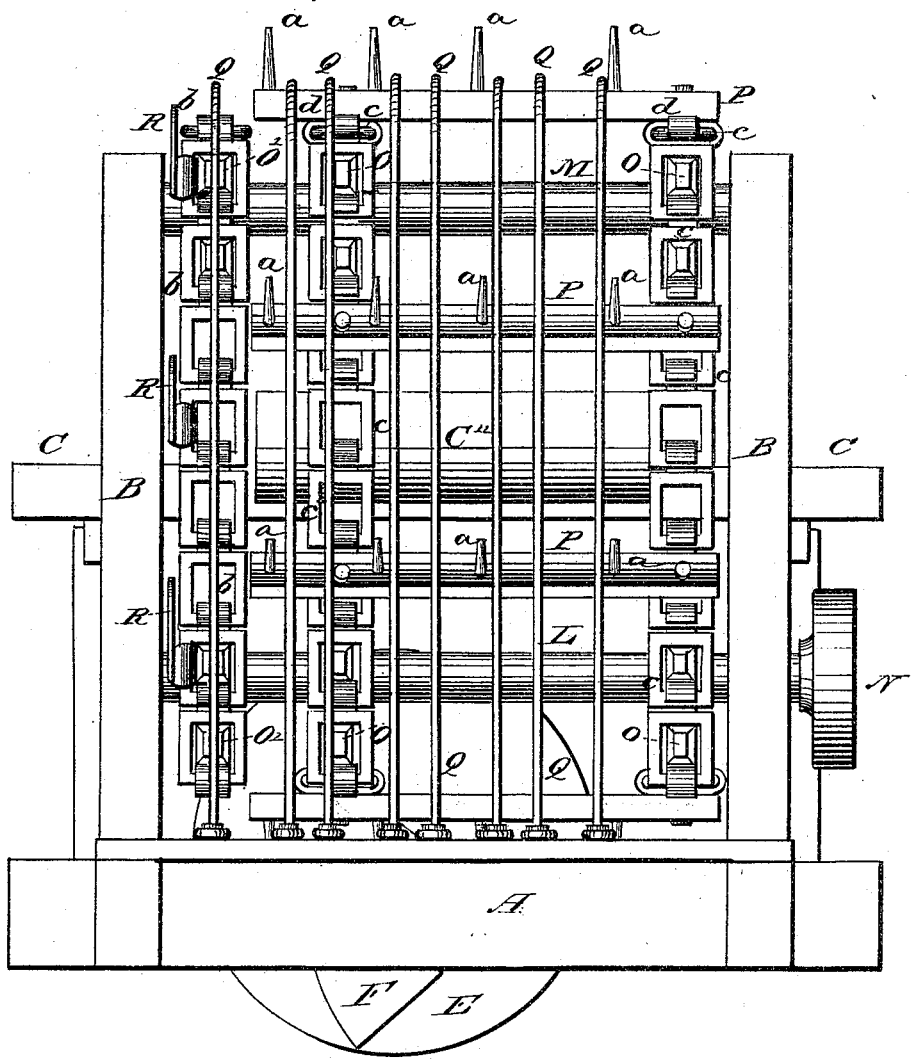

UNITED STATES PATENT OFFICE.

JOHN F. STEWARD AND FRANK J. CODDINGTON, OF PLANO, ASSIGNORS TO ELIJAH H. GAMMON AND WILLIAM DEERING, OF CHICAGO, ILL.

IMPROVEMENT IN HARVESTERS.

Specification forming part of Letters Patent No. 179,140, dated June 27, 1876; application filed January 22, 1876.

*To all whom it may concern:*

Be it known that we, JOHN F. STEWARD and FRANK J. CODDINGTON, of Plano, Kendall county, State of Illinois, have invented new and useful Improvements in Harvesting-Machines, of which the following is a full description, reference being had to the accompanying drawings, in which—

Figure 1 is a front view; Fig. 2, a side view from the inner or grain side of the machine; Fig. 3, a top or plan view of the receiver and binding-table; Fig. 4, a top or plan view of the drive-wheel and its supports; Fig. 5, an edge view of one of the drive or main wheel supports; Fig. 6, a longitudinal section of the axle; Fig. 7, a side view of one of the drive or main wheel supports; Fig. 8, a plan view of a portion of one of the chains; Fig. 9, a cross-section through the plate on the chain-link; Fig. 10, a plan view of a section of the chain carrying the side projections; Fig. 11, a cross-section of the same; Fig. 12, a longitudinal section on line $x\ x$ of Fig. 8.

This invention relates to harvesters, having for its object to improve the same; and consists in providing plates on the chains for attaching the bars to the elevator, and in the combination of points, as hereinafter described and pointed out in the claims.

In the drawings, A represents the main frame, which is extended out, so as to receive and support a carrier, (not shown,) and which is supported upon the main wheel, and an ordinary grain-wheel. The machine is provided with the ordinary cutting devices, grain-carrier, and other operative parts, which, as they may be made in any of the usual or well-known forms, are not shown or described. B is the frame upon which the elevator, receiver, and binding-table are supported; C, the binding-table; $C^1$, the opening or space left for the binders; $C^2$, the receiver; D, the stand or platform for the binders; E, the main or drive wheel; F F, the supports for the drive-wheel axle; G, the enlarged part of the axle; H, the pinions or gears near the ends of the axle; I, the circular sections of the axle or plates near the ends of the axle; J, the grooves in the supports F; K, the cogs or cogged segment on said supports; L M, the shafts by which the elevator is operated; N, the pulley-wheel, by which the shaft L is driven; O O', the sprocket-wheels; P, the cross-bars; Q, the supporting rods or slats; R, the projections or enlarged teeth at the front edge of the elevator; $a$, the pins or teeth projecting from the cross-bars P; $b$, the front chain of the elevator; $c$, the elevating-chains to which the cross-bars P are attached; $d$, the cross-plates on the chains $c$, for attaching the bars P; $e$, the hook or lock to prevent the axle from revolving; $f$, the holes in the enlarged portion of the axle or wheel G.

Grain-elevators, somewhat similar in construction and appearance to the one here shown, have heretofore been used in harvesting-machines. We construct our elevator with chains instead of straps or belts, as heretofore used. The chains $b\ c$ are made in their general construction in any of the usual forms, and the chain $b$ is provided, in a sufficient number of its links, with hooks or projections R, which are fastened onto their sides, as shown at Figs. 10 and 11. By this method of attaching these projections or hooks R, an efficient part of the elevator is extended to the full front, so that short grain can neither lag behind nor fall over. The chain $b$, which carries these hooks R, is separate from the rest of the elevator, and is provided with separate sprocket-wheels for operating it.

The wheel O' may be made larger than the upper one, if desired, so that this chain may have a faster motion than the other portion of the elevator; but when so arranged, the upper sprocket-wheel must run loose upon the shaft.

The chains $c$ are also driven by sprocket-wheels attached to the shaft L. A sufficient number of the links of these chains $c$ for attaching the cross-bars P are provided with plates $d$ extending across them, to which the bars P are riveted, as shown Fig. 2.

The bars P are provided with a sufficient number of teeth, $a$, to elevate all the grain, which is brought to the elevator by a carrier. The grain, in its ascent, is supported upon the rods Q, which extend over the face of the elevator, and around to the receiver $C^2$, as shown in Fig. 1.

By making the elevator in this manner, using chains and sprocket-wheels, all slipping or uncertainty of movement is avoided, and the elevator can be driven from the lower shaft L by means of the wheel N, so as to dispense with considerable belting in operating it.

Any suitable cover for keeping the grain down may be placed over the elevator here shown.

The binding-table C is connected with the receiver at its ends, and brought clear around, as shown in Fig. 3. A raised border is placed around its outer edge, and also around the opening $C^1$ for the binders. This opening extends around the front end of the table and receiver, so as to make room for an additional binder, when required for heavy grain, or a wide-cutting machine.

By placing one of the binders at or near the end of the receiver the middle binder can take his gavel from the receiver, and, at a half-turn, bind upon that portion of the table C which is behind him without interfering with either of the other binders. This arrangement of the opening gives sufficient room for this purpose, and it also takes the front binder out of the way of the swinging of the gavels, so that the machine may be worked with either two or three men, as desired. The binders stand upon the platform D.

The axle of the main or drive wheel E is supported by the side castings or supports F, which are permanently attached to the main frame. These supports are made in the form shown at Figs. 5 and 7, and have recesses in which the ends of the axle are moved up or down. The inner or shorter curve of the supports F is made plain, while the outer one is provided at its edge with a series of teeth or cogs, K, and behind the cogs, or between them and the main body of the support, is a groove, J. The axle of the main wheel is provided at each end with cogs or leaves H, which do not extend out to the end, but are cut or cast so as to leave a circular portion, I, of an equal width with the grooves J.

When the axle is in position the cogs or leaves H engage with the cogs K of the side supports, and the solid circular portions I run in the grooves J, which prevents the machine from spreading away from the ends of the axle. The circular portions I bear against the shorter curve of the side supports, and against the back of the grooves J, which prevent the cogs H K from wearing.

The wheel G is made a part of the axle; or it may be a separate wheel, and be permanently attached thereto. This wheel G is provided with a series of holes, $f$, in which the hook or lock $e$ (shown at Fig. 4) engages, so as to hold the axle in any position in which it may be placed. By this arrangement a very slight adjustment of the height of the machine may be made.

In operation the drive-wheel turns upon the axle, while the axle remains stationary. The drive-wheel is provided with the necessary gearing for operating the several parts; and the machine is raised or lowered by withdrawing the hook $e$, when the weight of the driving-wheel will carry the axle down, and, when in the desired position, it is locked by inserting the hook $e$ in one of the holes $f$ of the wheel G.

The operation of the elevator will be obvious without a further description.

The machine is raised by means of a suitable lever, which is placed in one of holes $f$ in the wheel $g$. By removing the hook $e$ from its engagement, and turning the wheel G in the proper direction by means of this lever, the machine will be raised, and, when in the desired position, it is locked by inserting the hook $e$.

What we claim as new, and desire to secure by Letters Patent, is as follows:

1. The plates $d$ on the chains $c$, for permanently attaching the bars P to the elevator, substantially as specified.

2. The hook or lock $e$, constructed as described, in combination with the wheel G, having openings $f$, the supports F, and the axle, all adapted to operate substantially as and for the purpose specified.

JOHN F. STEWARD.
FRANK J. CODDINGTON.

Witnesses:
EDGAR L. HENNING,
FRANK LULL.